United States Patent
Maetaki (10) Patent No.: US 8,773,783 B2
(45) Date of Patent: Jul. 8, 2014

(54) OPTICAL SYSTEM AND OPTICAL APPARATUS HAVING THE SAME

(71) Applicant: Canon Kabushiki Kaisha, Tokyo (JP)

(72) Inventor: Satoshi Maetaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/677,550

(22) Filed: Nov. 15, 2012

(65) Prior Publication Data

US 2013/0135514 A1    May 30, 2013

(30) Foreign Application Priority Data

Nov. 30, 2011    (JP) .................. 2011-261634

(51) Int. Cl.
*G02B 9/04* (2006.01)
*H04N 5/225* (2006.01)
*G02B 27/00* (2006.01)

(52) U.S. Cl.
CPC ............. *G02B 9/04* (2013.01); *H04N 5/225* (2013.01); *G02B 27/0025* (2013.01)
USPC ............................. 359/793; 348/340

(58) Field of Classification Search
CPC ............. G02B 9/04; G02B 9/06; G02B 9/08; G02B 27/0025; G02B 27/005; G02B 27/0062; H04N 5/225
USPC ........................... 348/340; 359/793, 794, 795
See application file for complete search history.

(56) References Cited

U.S. PATENT DOCUMENTS

| 7,411,745 | B2 | 8/2008 | Wada |  |
|---|---|---|---|---|
| 8,526,124 | B2* | 9/2013 | Maetaki | ............ 359/716 |
| 2005/0248857 | A1 | 11/2005 | Wada |  |
| 2013/0169851 | A1* | 7/2013 | Maetaki | ............ 348/335 |

FOREIGN PATENT DOCUMENTS

| JP | 05-188286 A | 7/1993 |
|---|---|---|
| JP | 2005-321574 A | 11/2005 |

* cited by examiner

*Primary Examiner* — David N Spector
(74) *Attorney, Agent, or Firm* — Fitzpatrick, Cella, Harper & Scinto (57) ABSTRACT

An optical system includes, in order from an object side to an image side, a front unit having a positive refractive power, an aperture diaphragm, and a rear unit. The front unit includes a first lens unit having a positive refractive power. The rear unit includes a second unit adjacent to the aperture diaphragm and configured to move in focusing. The first lens unit includes n (which is an integer of 2 or higher) positive lenses and one or more negative lenses. The materials of at least two positive lenses of the n positive lenses in the first lens unit satisfy $0.0100 < \Delta\theta gF$ where $\Delta\theta gF$ is an abnormal partial dispersion of each material. The material of one or more positive lenses of the n positive lenses in the first lens unit satisfies $0.0272 < \Delta\theta gF$. Additional conditional expressions are satisfied.

14 Claims, 5 Drawing Sheets

OPTICAL SYSTEM AND OPTICAL APPARATUS HAVING THE SAME

BACKGROUND OF THE INVENTION

1. Field of the Invention

The present invention relates to an optical system and an optical apparatus, such as a digital still camera, a digital video camera, a film-based camera, a surveillance camera, and a projector.

2. Description of the Related Art

As an image pickup optical system used for an optical apparatus such as a digital camera and a video camera, there is known an image pickup optical system having such a high numerical aperture that an F-number is about 1.2 to 2.0 and an intermediate focal length that is a comparatively long focal length. This image pickup optical system is used widely for the portrait photography and indoor sport photography. Such an image pickup optical system is demanded for a small lens overall length (which is a distance from a first lens surface to an image plane), a small configuration, and high optical performance.

In general, a chromatic aberration, such as a longitudinal chromatic aberration and a lateral chromatic aberration, increases as the lens overall length becomes short and the optical performance deteriorates in the image pickup optical system. In particular, the chromatic aberration increases as the focal length becomes long in an intermediate telephoto lens and a telephoto lens which have a long focal length. Moreover, the chromatic aberration increases as the lens overall length becomes short.

On the other hand, a bright image pickup optical system having a high numerical aperture has a shallow depth of field, and a variety of aberrations strongly influence on the image quality. A more highly accurate aberration correction is required for the bright image pickup optical system. Accordingly, Japanese Patent Laid-Open No. ("JP") 05-188286 discloses an intermediate telephoto image pickup optics system which has a high numerical aperture and a comparatively long focal length. JP 2005-321574 discloses a telephoto lens that includes a front unit on the object side including a lens made of an abnormal partial dispersion material such as fluorite so as to correct the chromatic aberration. The image pickup optical system disclosed in JP 05-188286 includes many lenses each made of a high refractive index and an intermediate dispersion glass material so as to correct a variety of aberrations such as a spherical aberration and a curvature of field. The telephoto lens disclosed in JP 2005-321574 includes many lenses each made of a low-refractive-index and low-dispersion glass material so as to correct the chromatic aberration.

The longitudinal chromatic aberration generally deteriorates when a high-refractive-index and intermediate-dispersion glass material having an Abbe number of about 40-60 and a refractive index of about 1.6-1.8 is used for a lens having a positive refractive power because that glass material has a negative abnormal partial dispersion. When a low-refractive-index and low-dispersion glass material having an Abbe number of about 70-90 and a refractive index of about 1.4-1.5 is used for a lens having a positive refractive power, a longitudinal chromatic aberration can be properly corrected because that glass material has a positive abnormal partial dispersion. However, the lens surface (refractive surface) needs a high curvature for a desired refractive power because the refractive index is low. As a result, the spherical aberration and curvature of field are likely to occur. In order to obtain high optical performance over the screen, it is necessary to select a proper glass material, and to properly correct the chromatic aberration and other aberrations, such as a spherical aberration and a curvature of field.

In particular, in the intermediate focal length lens having a comparatively long focal length and a high numerical aperture, it becomes difficult to obtain high optical performance over the screen unless the chromatic aberration and other aberrations, such as a spherical aberration and a curvature of field, are well corrected.

SUMMARY OF THE INVENTION

An optical system according to the present invention includes, in order from an object side to an image side, a front unit having a positive refractive power, an aperture diaphragm, and a rear unit. The front unit includes a first lens unit having a positive refractive power, the rear unit includes a second unit adjacent to the aperture diaphragm and configured to move in focusing, and the first lens unit includes n (n is an integer of 2 or higher) positive lenses and one or more negative lenses. Materials of at least two positive lenses of the n positive lenses in the first lens unit satisfy $0.0100 < \Delta\theta gF$ where $\Delta\theta gF$ is an abnormal partial dispersion of each material. The material of one or more positive lenses of the n positive lenses in the first lens unit satisfies $0.0272 < \Delta\theta gF$. $0.15 < Rp/ftotal < 0.90$ and $-15.00 < Rn/ftotal < -0.15$ are satisfied where Rp denotes a radius of curvature of a refractive surface that is concave and closest to an image of the first lens unit L1, Rn denotes a radius of curvature of a refractive surface that is concave and closest to an object of the second lens unit, and ftotal is a focal length of an entire optical system.

Further features of the present invention will become apparent from the following description of exemplary embodiments with reference to the attached drawings.

DESCRIPTION OF THE EMBODIMENTS

A description will now be given of an optical system and an optical apparatus having the same according to this embodiment. The optical system of this embodiment includes, in order from the object side to the image side, a front unit having a positive refractive power, an aperture diaphragm, and a rear unit. The front unit includes a first lens unit having a positive refractive index. The rear unit neighbors the aperture diaphragm, and includes a second lens unit configured to move in focusing. The first lens unit includes "n" (which is an integer equal to or larger than 2) positive lenses and one or more negative lenses.

Figure 1:
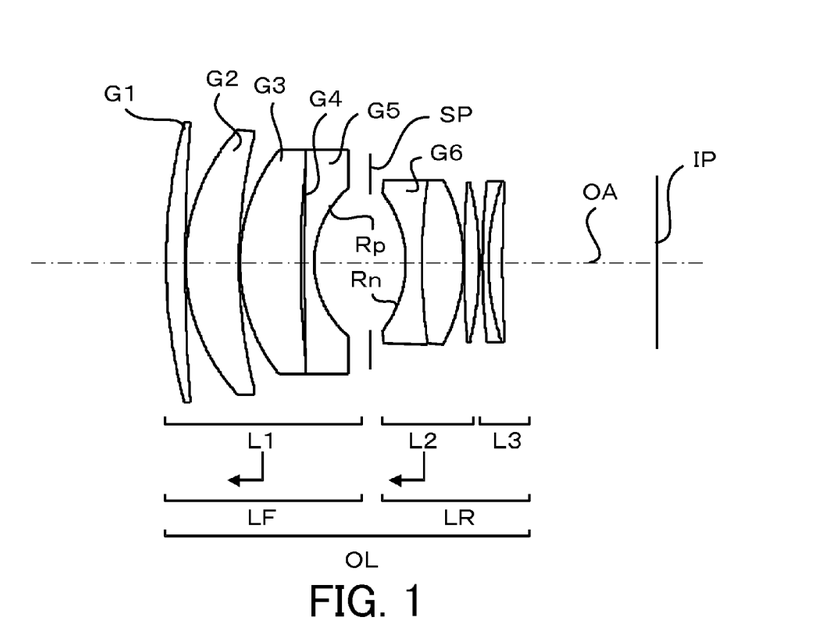
FIG. 1 is a sectional view of an optical system according to a first embodiment.
Figure 2:
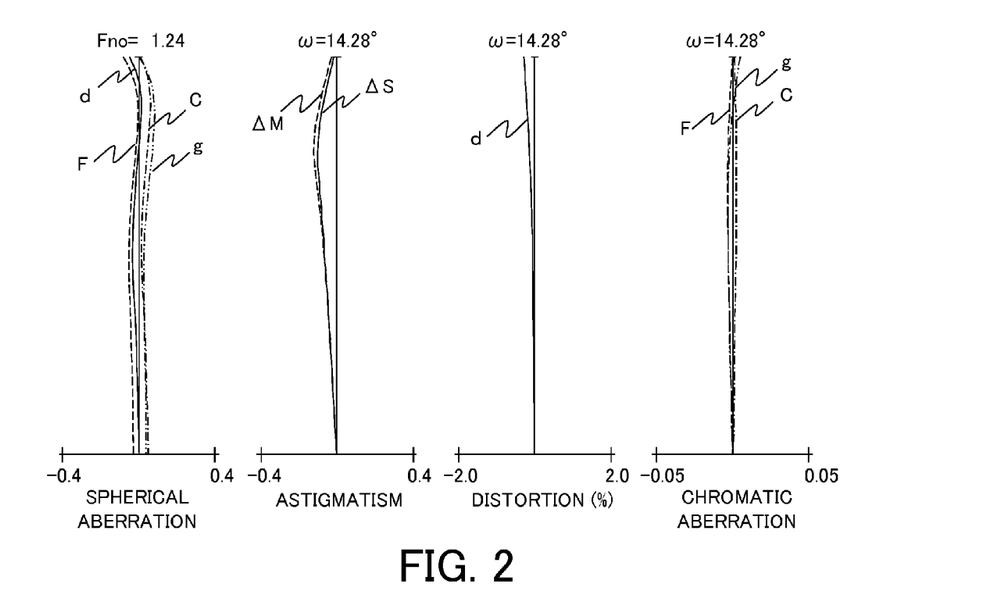
FIG. 2 is a longitudinal aberrational diagram of an optical system that focuses on an infinite end according to the first embodiment.
Figure 3:
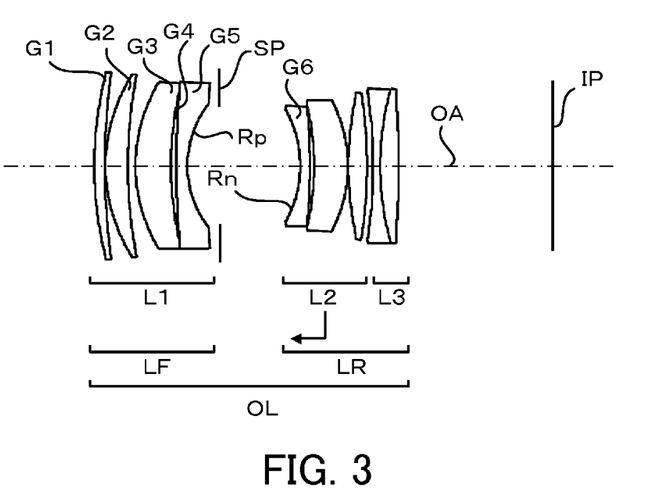
FIG. 3 is a sectional view of an optical system according to a second embodiment.
Figure 4:
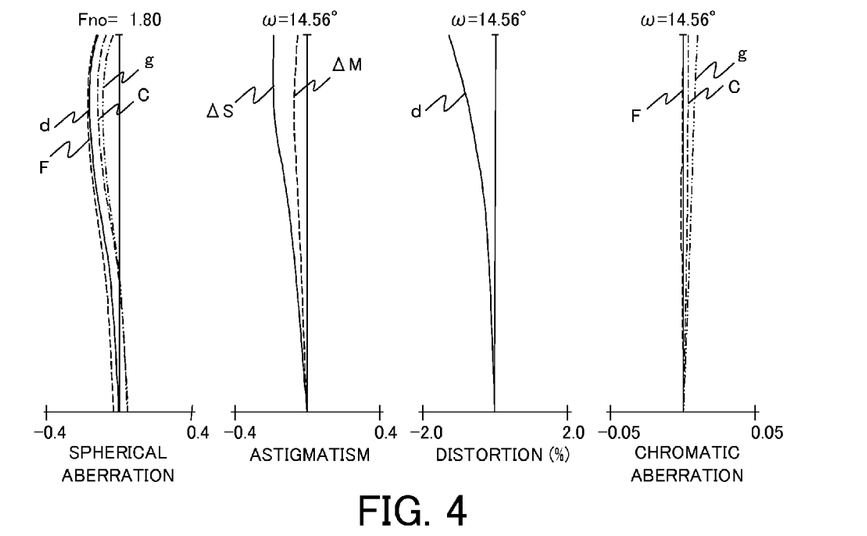
FIG. 4 is a longitudinal aberrational diagram of an optical system that focuses on an infinite end according to the second embodiment.
Figure 5:
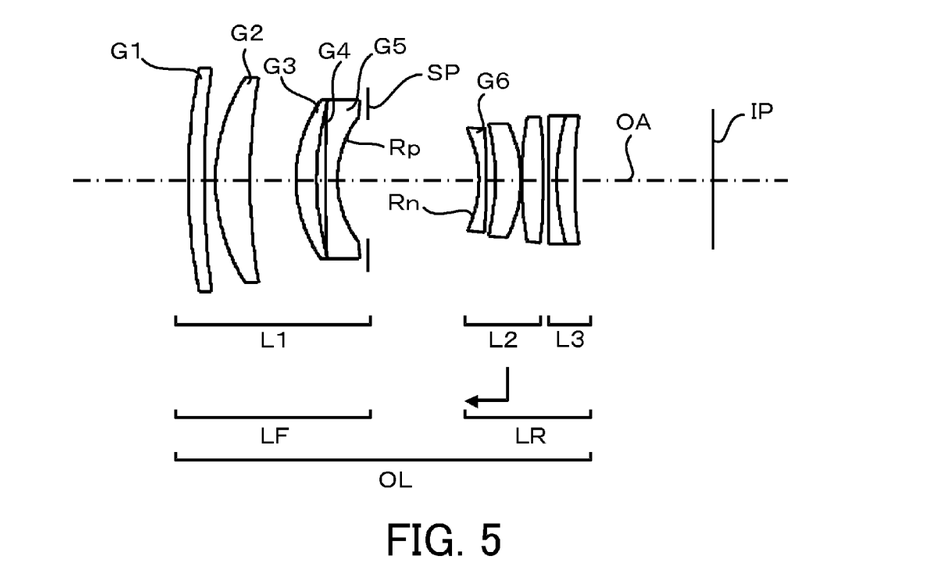
FIG. 5 is a sectional view of an optical system according to a third embodiment.

Next follows a description of each embodiment according to the present invention. FIG. 1 is a sectional view of an optical system according to a first embodiment of the present invention. FIG. 2 illustrates a variety of aberrations of an optical system that focuses on an infinite end according to the first embodiment. FIG. 3 is a sectional view of an optical system according to a second embodiment of the present invention. FIG. 4 illustrates a variety of aberrations of an optical system that focuses on an infinite end according to the second embodiment. FIG. 5 is a sectional view of an optical system according to a third embodiment of the present invention.

Figure 6:
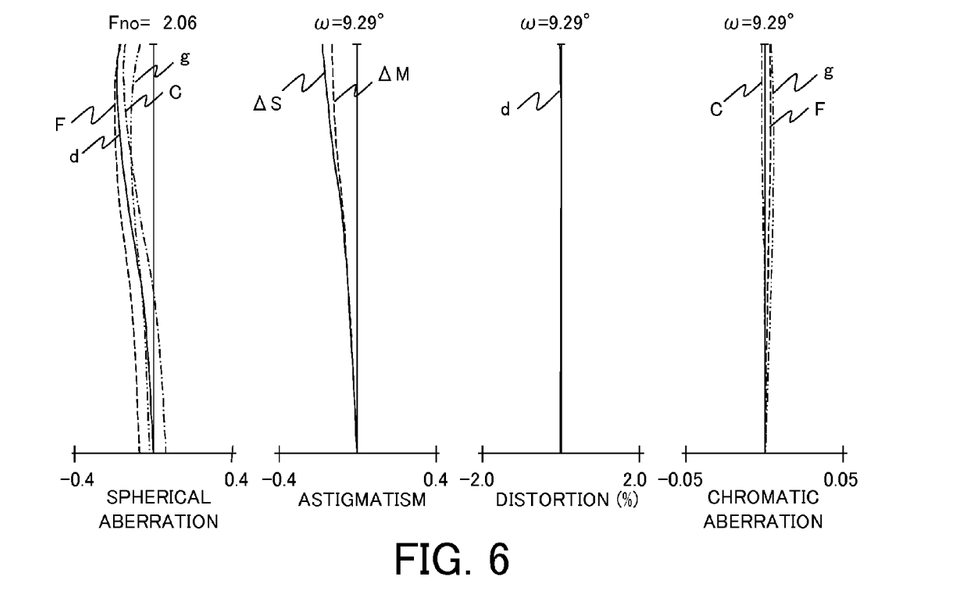
FIG. 6 is a longitudinal aberrational diagram of an optical system that focuses on an infinite end according to the third embodiment.
Figure 7:
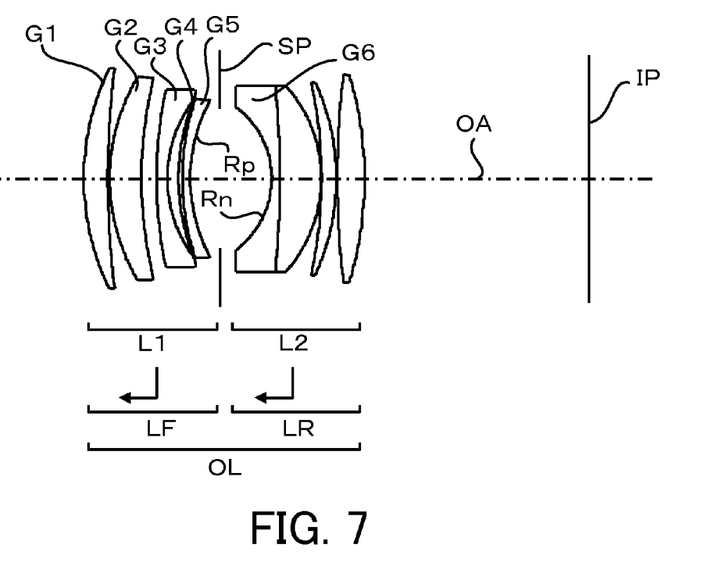
FIG. 7 is a sectional view of an optical system according to a fourth embodiment.
Figure 8:
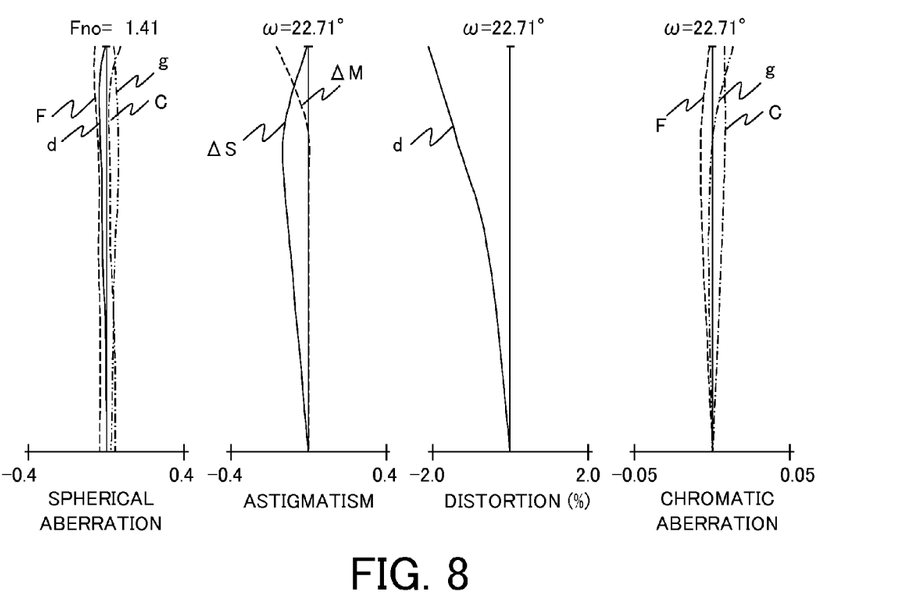
FIG. 8 is a longitudinal aberrational diagram of an optical system that focuses on an infinite end according to the fourth embodiment.
Figure 9:
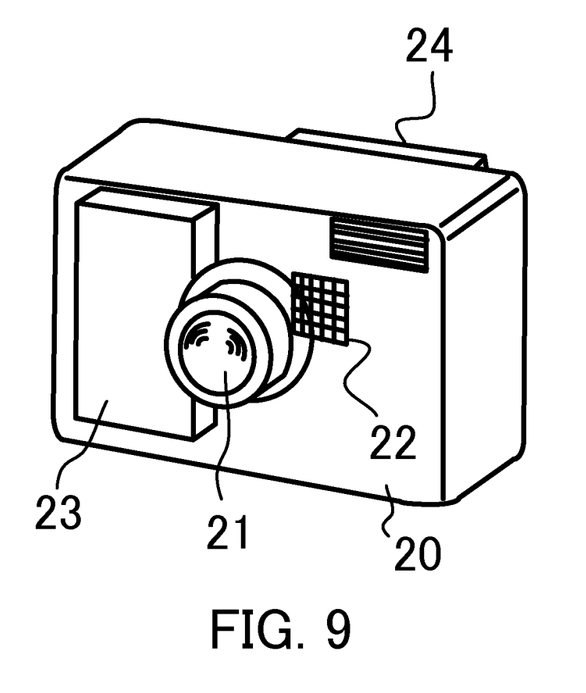
FIG. 9 is a schematic view of principal part of an optical apparatus (image pickup apparatus) according to the present invention.

FIG. 6 illustrates a variety of aberrations of an optical system that focuses on an infinite end according to the third embodiment. FIG. 7 is a sectional view of an optical system according to a fourth embodiment of the present invention. FIG. 8 illustrates a variety of aberrations of an optical system when an infinite end is focused according to the fourth embodiment. FIG. 9 is a schematic view of principal part of an optical apparatus (image pickup apparatus) according to the present invention.

The optical system of each embodiment includes an intermediate focal length lens that is a comparatively long focal length. Herein, the intermediate focal length lens is an image pickup optical system having an image pickup angle of view of about 12° to 50°. In the lens sectional view, the left side is an object side (front side or enlarged side) and the right side is an image side (back side or reduced side).

"OL" denotes an optical system, which includes, in order from the object side to the image side, a front unit LF having a positive refractive power, an aperture diaphragm SP, a rear unit LR having a positive refractive power. When it is assumed that "j" is an order of the lens unit counted from the object side to the image side, Lj (j=1, 2, 3) denotes a j-th lens unit. When it is assumed that "k" is an order of the lens unit counted from the object side to the image side, Gk (k=1, 2, 3) denotes a k-th lens unit.

"IP" denotes an image plane, which corresponds to an image pickup plane of a solid-state image sensor (photoelectric conversion element), such as a CCD sensor and a CMOS sensor, in an image pickup optical system for a video camera or a digital still camera. When it is used for a film-based camera, an image plane corresponds to a film plane. "OA" denotes an optical axis.

In the aberrational diagram, "d," "g," "C," and "F" denote the d-line, the g-line, the C-line, and the F-line, respectively. $\Delta M$ and $\Delta S$ are a meridional image plane and a sagittal image plane to the d-line. The distortion is expressed by the d-line. "Fno" denotes an F number, and $\omega$ is half an angle of view (degree).

The front unit LF in the optical system OL in each embodiment includes a first lens unit L1 having a positive refractive power. The aperture diaphragm SP is arranged on the image side just after the first lens unit L1. The rear unit LR can include the aperture diaphragm SP and the second lens unit L2 on the image side just after the aperture diaphragm SP. The rear unit LR further includes a third lens unit L3 having a positive refractive power on the image side of the second lens unit L2. The first lens unit L1 includes a two or more lenses each having a positive refractive power (two or more positive lenses), and one or more lenses each having a negative refractive power.

In each embodiment, assume that $\Delta\theta gF$ is an abnormal partial dispersion of a material. Then, materials of at least two positive lenses in the first lens unit L1 satisfy the following conditional expression:

$$0.0100 < \Delta\theta gF \tag{1}$$

A material of one or more positive lenses in the first lens unit L1 satisfies the following conditional expression:

$$0.0272 < \Delta\theta gF \tag{2}$$

The following conditional expressions are satisfied where "Rp" denotes a radius of curvature of a concave refractive surface closest to the image of the first lens unit L1, "Rn" denotes a radius of curvature of a concave refractive surface closest to the object of the second lens unit L2, and "ftotal" is a focal length of the entire system:

$$0.15 < Rp/f\text{total} < 0.90 \tag{3}$$

$$-15.00 < Rn/f\text{total} < -0.15 \tag{4}$$

Next follows a description of a technical meaning of each conditional expression.

A description will be given of the abnormal partial dispersion (abnormal partial dispersion ratio) $\Delta\theta gF$ in the material of the conditional expressions (1) and (2). Now assume that "Ng," "Nf," "Nd," and "NC" denote refractive indices for the g-line (435.8 nm), the F-line (486.1 nm), the d-line (587.6 nm), and the C-line (656.3 nm). Then, the Abbe number $\nu d$, the partial dispersion ratio $\theta gF$, and the abnormal partial dispersion $\Delta\theta gF$ can be expressed as follows:

$$\nu d = (Nd-1)/(NF-NC) \tag{a}$$

$$\theta gF = (Ng-NF)/(NF-NC) \tag{b}$$

$$\Delta\theta gF = \theta gF - (-1.665 \times 10^{-7} \times \nu d^3 + 5.213 \times 10^{-5} \times \nu d^2 - 5.656 \times 10^{-3} \times \nu d + 7.278 \times 10^{-1}) \tag{c}$$

The conditional expressions (1) and (2) represent the abnormal partial dispersion of the positive lens in the first lens unit L1. It is likely that the chromatic aberration can be well corrected by using the lens made of the material that satisfies the conditional expressions (1) and (2). When values become lower than the lower limits of the conditional expressions (1) and (2), the correction of the chromatic aberration becomes insufficient.

A crystalline material, such as fluorite, is known as a material that satisfies the conditional expression (1). Fluorite exhibits a low dispersion and an abnormal partial dispersion. Other materials are optical glass, such as S-FPL53, S-FPL51, S-FPM2 (trade names manufactured by OHARA Inc.) and FCD100, FCD1, and FCD505 (trade names manufactured by HOYA Corporation).

For example, acrylic UV curing resin (Nd=1.633, vd=23.0, and $\theta gF$=0.68) and N-polyvinyl carbazole (Nd=1.696, vd=17.7, $\theta gF$=0.69) are known as specific examples of the optical material that satisfies the conditional expression (2). As long as the conditional expression (2) is satisfied, the material is not limited to the above materials.

An optical material that has a characteristic different from a general glass material is a mixture in which the following inorganic oxide nanoparticles are dispersed in synthetic resin, such as $TiO_2$ (Nd=2.758, vd=9.54, $\theta gF$=0.76). When $TiO_2$ nanoparticles are dispersed with a proper volume ratio in synthetic resin, the optical material that satisfies the conditional expression (2) can be obtained. As long as the conditional expression (2) is satisfied, the material is not limited to this example.

$TiO_2$ is a material used for a wide variety of applications, for example a deposition material of an optical thin film, such as an anti-reflection film in the field of optics. Other applications are photocatalysts and white pigments, and the $TiO_2$ nanoparticles are used as a cosmetics material.

An average diameter of each nanoparticle dispersed in the resin in each embodiment may be about 2 nm to 50 nm when the influence of scattering, etc. are considered, and the dispersing agent etc. may be added so as to suppress cohesions well. Polymer is a suitable medium material used to disperse the nanoparticles, and a mass production is facilitated by optical or heat polymerization molding with a mold etc. A dispersion characteristic N(λ) of the mixture in which the nanoparticles are dispersed can be easily calculated by the following expression derived from the well-known Drude expression:

In other words, the refractive index N(λ) for the wavelength λ is given as follows:

$$N(\lambda) = [1 + V\{Npar(\lambda)^2 - 1\} + (1-V)\{Npoly(\lambda)^2 - 1\}]^{1/2}$$

Herein, λ denotes an arbitrary wavelength, Npar is a refractive index of a nanoparticle, Npoly is a refractive index of polymer, and V is a ratio to a total volume of a nanoparticle to a polymer volume.

The resin and organic compound in which nanoparticles are dispersed in resin are optical materials that satisfy the conditional expression (2).

Each embodiment utilizes an optical inorganic material, such as glass, as a material that satisfies the conditional expression (1), and the above organic compound as a material that satisfies the conditional expression (2).

Thus, in each embodiment, at least one of the at least two positive lenses each of which satisfies $0.0100 < \Delta\theta gF$ is made of an organic compound in the first lens unit L1 where $\Delta\theta gF$ is the abnormal partial dispersion of the material. In addition, at least one of the at least two positive lenses is made of an inorganic material.

In the optical system of each embodiment, the refractive surface closest to the image in the first lens unit L1 has a concave surface on the image side, and the refractive surface closest to the object in the second lens unit L2 has a concave surface on the object side.

Each of the conditional expressions (3) and (4) relates to a radius of curvature of a refractive surface closest to the image in the first lens unit L1 and a radius of curvature of a refractive surface closest to the object in the second lens unit L2. These refractive surfaces have concave surfaces that face each other and hold the aperture diaphragm SP. These concave surfaces are used to properly correct the curvature of field and particularly coma and sagittal halo. Outside the range of the conditional expressions (3) and (4), a variety of aberrations, particularly coma and sagittal halo, are likely to deteriorate.

As illustrated by the conditional expression (3), the refractive surface closest to the image in the first lens unit L1 needs a high curvature to some extent. In contrast, as illustrated by the conditional expression (4), the curvature of the refractive surface closest to the object in the second lens unit L2 may be loose to some extent or take a shape close to a plane.

The numerical values of the conditional expressions (1) to (4) may satisfy the following expressions:

$$0.0110 < \Delta\theta gF < 0.0200 \quad (1a)$$

$$0.0400 < \Delta\theta gF \quad (2a)$$

$$0.20 < Rp/ftotal < 0.80 \quad (3a)$$

$$-1.00 < Rn/ftotal < -0.20 \quad (4a)$$

Each embodiment can present the optical system that has high optical performance in which a variety of aberrations, such as a chromatic aberration, can be properly corrected.

One or more of the following various conditions may be satisfied in each embodiment.

It is assumed that "i" denotes the order counted from the object side, $\Delta\theta gFi$ (i=1, 2, ..., n) denotes an abnormal partial dispersion of the material of an i-th positive lens in the first lens unit L1, and vdi (i=1, 2, ..., n) denotes an Abbe number of the material of the i-th positive lens in the first lens unit L1.

Similarly, assume that max(vd) and min(vd) denote maximum and minimum values of the Abbe number of the material of the positive lens in the first lens unit L1.

Assume that min(Nd) denotes a minimum value of the refractive index of the material of the positive lens in the first lens unit L1.

Assume that "fair" denotes a focal length of an airy lens between the refractive surface closest to the image in the first lens unit L1 and the refractive surface closest to the object in the second lens unit L2.

Assume that "Fno" denotes a numerical aperture of the optical system OL that focuses on the infinite end.

Assume that "fp" denotes a focal length of the first lens unit L1 and "fi" (i=1, 2, ..., n) denotes a focal length of the i-th positive lens in the first lens unit L1.

Assume that ω is half an image pickup field of angle when the optical system of each embodiment is used for an optical apparatus (image pickup apparatus) that includes a photoelectrical conversion element.

At this time, one or more of the following conditions may be satisfied:

$$5.0 < (\Delta\theta gFm1/vdm1)/(\Delta\theta gFm2/vdm2) < 50.0 \quad (5)$$

(where m1 and m2 denote convex lenses in the first unit, and these two values satisfy $1 \leq m1 \leq n$, $1 \leq m2 \leq n$, and $0.0 < \Delta\theta gFm2/vdm2 < \Delta\theta gFm1/vdm1$.)

$$2.2 < max(vd)/min(vd) \quad (6)$$

$$min(vd) < 30.0 \quad (7)$$

$$1.55 < min(Ndi) \quad (8)$$

$$-0.900 < fair/ftotal < -0.100 \quad (9)$$

$$Fno < 2.5 \quad (10)$$

$$5.00 \times 10^{-4} < \Sigma(\Delta\theta gFi/vdi) \times (fp/fi) \quad (11)$$

$$6° < \omega < 25° \quad (12)$$

Next follows a technical meaning of each conditional expression:

The conditional expression (5) means that the first lens unit L1 includes a lens made of a combination material that satisfies these conditional expressions. The correcting power of the chromatic aberration on the short wavelength side of the optical material of the lens in the optical system is proportional to the abnormal partial dispersion $\Delta\theta gF$ and inversely proportional to the Abbe number vd. The conditional expression (5) denotes a ratio of a correcting power to the chromatic aberration between two positive lenses in the first lens unit L1.

The (refractive) power allotment among lenses placed in the optical system can become easier when the ratio of the correcting power of the chromatic aberration between these two lenses falls in an appropriate range. When the conditional expression (5) is satisfied, the power allotment of the positive lens configured to correct the chromatic aberration become appropriate, and a variety of aberrations, such as a chromatic aberration, a spherical aberration, a curvature of field, and a coma can be properly corrected.

The excessively high and excessively low values of the conditional expression cause the correcting power of the chromatic aberration to excessively concentrate on one of the positive lenses configured to correct the chromatic aberration. Therefore, for example, the excessively high power causes a high curvature of the lens surface and high sensitivity, or the excessively low power causes an insufficient optical operation.

The conditional expression (6) expresses a ratio between the maximum value and a minimum value of the Abbe number vd of the glass material used for the positive lens in the first lens unit L1. When the conditional expression (6) is satisfied, the chromatic aberration can be well corrected while the chromatic aberration of the entire optical system can be maintained low. A more detailed description will be given. Since the (bright) optical system having an F-number between about 1.2 and 2.0 has a shallow depth of field, it is necessary to properly correct a variety of aberrations, such as a chromatic aberration, a spherical aberration, a field of curvature, and a coma.

Usually, such bright optical system includes a positive lens in a first lens unit L1 which is made of a glass material having a refractive index so as to correct the variety of aberrations, such as a spherical aberration and a field of curvature. For example, a glass material having an Abbe number vd of about 40-60, a high refractive index of about 1.6-1.8, and an intermediate dispersion is used for a positive lens, and a glass material having an Abbe number vd of about 20-30, a high refractive index of about 1.6-1.8, and a high dispersion is used for a negative lens. A variety of aberrations are corrected by combining these glass materials.

However, the glass material having an Abbe number vd of about 40-60 and a refractive index of about 1.6-1.8 is likely to have a negative value of the abnormal partial dispersion $\Delta\theta gF$, and thus the chromatic aberration is likely to deteriorate when it is used for a positive lens. This is remarkable in a large-aperture intermediate telephoto lens in which a chromatic aberration is likely to stand out and the focal length is comparatively long. The glass material having a low refractive index and a low dispersion, such as fluorite having an abnormal dispersion can be used for the positive lens if only the chromatic aberration is to be corrected.

However, in that case, the curvature of the lens surface needs to be stronger so as to obtain the intended refractive power because the refractive index is low and thus the spherical aberration and the curvature of field deteriorate. In addition, the negative lens combined with the positive lens needs to shift to the low dispersion side as the positive lens shifts to the low dispersion side. Even in that case, the curvature of the lens surface of the negative lens needs to be stronger so as to satisfy the achromatic condition and the coma and the sagittal flare deteriorate.

Accordingly, the first lens unit L1 in the optical system of this embodiment includes two or more positive lenses and uses a combination of a high dispersion glass material and a low dispersion glass material for the positive lens so as to satisfy the conditional expression (6). This combination can maintain low the chromatic aberrations of a plurality of positive and negative lenses in the first lens unit L1.

As a result, the coma and sagittal halo are properly corrected without shifting the material of the negative lens to the low dispersion side and without unnecessarily increasing the curvature of the lens surface. In addition, the values of the abnormal partial dispersions $\Delta\theta gF$ of the high dispersion glass material and comparatively low dispersion glass material are higher than that of the intermediate dispersion glass material having the Abbe number vd of 40-60, and the chromatic aberration can be well corrected.

When the value deviates from the conditional expression (6), it is difficult to properly correct the chromatic aberration of the overall system and to properly correct a variety of aberrations, such as a spherical aberration, a curvature of field, and a coma.

The conditional expression (7) illustrates a minimum value of the Abbe number vd of the glass material used for the positive lens in the first lens unit L1. The effective correction of the chromatic aberration can be easier when the high dispersion glass material that satisfies the conditional expression (7) is used for the positive lens. When the value deviates from the range of the conditional expression (7), the correction of the chromatic aberration becomes difficult.

The conditional expression (8) represents the minimum value of the refractive index of the glass material in the positive lens in the first lens unit L1. When the glass material that satisfies the conditional expression (8) is used for the positive lens, the proper correction of the spherical aberration, the curvature of field, and the coma, can be easier. When the value deviates from the range of the conditional expression (8), the corrections of these various aberrations become difficult.

The conditional expression (9) relates to a ratio between a focal length of the airy lens between a refractive surface of the first lens unit L1 closest to the image and a refractive surface of the second lens unit L2 closest to the object which face each other and hold the aperture diaphragm SP, and a focal length of the entire system. A variety of aberrations, in particular the coma and the sagittal halo, can be excellently corrected by maintaining the refractive power of this airy lens in the predetermined range. When the value deviates from the range of the conditional expression (9), a variety of aberrations, in particular the coma and the sagittal halo, are likely to deteriorate.

The conditional expression (10) is a conditional expression relating to the F-number of the numerical aperture of the optical system. A bright optical system can be realized by satisfying the conditional expression (10).

A description will now be given of the conditional expression (11). An amount of the chromatic aberration generated by the lens in the optical system is in inversely proportional to the Abbe number vd of the material, and is proportional to the refractive power $1/f(=\phi)$. However, this is an amount of the chromatic aberration for the F-line to the C-line, which is represented by the Abbe number vd.

Usually, it is also necessary to correct the chromatic aberration of the image pickup lens for the g-line on the short wavelength side of the F-line. In other words, the chromatic aberration in the broad wavelength band from the g-line to the C-line needs to be wholly maintained low. Thus, unless the chromatic aberration on the short wavelength side can be properly corrected, the amount of the chromatic aberration generated in the entire optical system eventually increases. The amount of the chromatic aberration generated in the g-line to the F-line is inversely proportional to the Abbe number vd and proportional to the partial dispersion ratio $\theta gF$ and the refractive power $1/f(=\Phi)$.

The corrective effect of the chromatic aberration on the short wavelength side is inversely proportional to the Abbe number vd and proportional to the partial dispersion ratio $\theta gF$ and the refractive power $1/f(=\Phi)$ as follows:

$$(\Delta\theta gF/vd)/f \tag{d}$$

In the lens arranged in the optical system, if the absolute value of the numerical value represented by the above expression (d) is high, the chromatic aberration correcting effect increases.

The conditional expression (11) was devised by the above finding, and means a sum of the correcting effect of the chromatic aberration of the positive lens in the first lens unit L1. In the conditional expression (11), the refractive power 1/f of each lens is divided by the refraction power 1/fp of the first lens unit L1 and normalized so as to indicate the achromatic effect in the first lens unit L1.

When the conditional expression (11) is satisfied, the positive lens in the first lens unit L1 can exhibit a sufficient correcting effect of the chromatic aberration, and can reduce the amount of the chromatic aberration of the entire optical system. When the value deviates from the conditional expression (11), the correcting effect of the chromatic aberration becomes insufficient and the correction of the chromatic aberration of the entire optical system becomes insufficient.

The conditional expression (12) relates to half an image pickup angle of view when the optical system is applied to an optical apparatus that includes a photoelectric conversion element. When the conditional expression (12) is satisfied, a variety of aberrations, such as a chromatic aberration, can be properly corrected.

Thus, each embodiment provides an optical system having a high numerical aperture and a well-corrected variety of aberrations, such as a chromatic aberration, a spherical aberration, and a curvature of field.

In each embodiment, the numerical ranges of the conditional expressions (5) to (11) may be replaced as follows:

$$8.0 < (\Delta\theta gFm1/vdm1)/(\Delta\theta gFm2/vdm2) < 45.0 \quad (5a)$$

$$2.5 < \max(vd)/\min(vd) < 5.0 \quad (6a)$$

$$10.0 < \min(vd) < 25.0 \quad (7a)$$

$$1.552 < \min(Nd)(i=1, 2, \ldots, n) \quad (8a)$$

$$-0.500 < fair/ftotal < -0.110 \quad (9a)$$

$$Fno < 2.2 \quad (10a)$$

$$1.00 \times 10^{-3} < \Sigma(\Delta\theta gFi/vdi) \times (fp/fi) \quad (11a)$$

$$6° < \omega < 24° \quad (12a)$$

A lens configuration of each embodiment will now be described.

First Embodiment

A description will be given of an optical system OL according to a first embodiment illustrated in FIG. 1. The optical system OL according to the first embodiment includes a lens having a high numerical aperture and an intermediate focal length. The optical system OL illustrated in FIG. 1 includes, in order from the object side to the image side, a front unit LF having a positive refractive power, an aperture diaphragm SP, and a rear unit LR having a positive refractive power. The front unit LF includes a first lens unit L1 having a positive refractive power. The rear unit LR includes a second lens unit L2 having a positive refractive power and a third lens unit L3 having a positive refractive power.

In focusing from the infinite object to the near object, the first lens unit L1, the aperture diaphragm SP, and the second lens unit L2 are moved to the object side. The third lens unit L3 is fixed in this case.

The first lens unit L1 includes four positive lenses G1, G2, G3, and G4 and one negative lens G5. The focal length of the first lens unit L1 is 201.74 (mm). This value is made by representing the following numerical example by the millimeter unit. This is true of other embodiments.

The entire system has a focal length of 85.00 mm, a numerical aperture (Fno) of 1.24, and half an angle of view of 14.28°.

The focal lengths of the positive lenses G1, G2, G3, and G4 in the first lens unit L1 are 218.68, 122.14, 85.81, and 485.71, respectively. The R1 surface (lens surface on the object side) of the positive lens G2 has an aspheric shape. The glass material of the positive lens G1 is S-TIH53 (trade name made by OHARA Inc.), the refractive index Nd to the d-line is 1.847, and the Abbe number vd is 23.8.

The partial dispersion ratio $\theta gF$ is 0.620, and the abnormal partial dispersion $\Delta\theta gF$ is 0.0000. The glass materials of the positive lenses G2 and G3 are S-FPM2 (trade name made by OHARA Inc.), the refractive index Nd to the d-line is 1.595, and the Abbe number vd is 67.7. The partial dispersion ratio $\theta gF$ is 0.544, and the abnormal partial dispersion $\Delta\theta gF$ is 0.0120.

The material of the positive lens G4 is made by hardening the organic compound containing the above nanoparticle dispersion materials and by mixing $TiO_2$ nanoparticles in acryl with a volume ratio of 15%. This material has a refractive index Nd of 1.765, an Abbe number vd of 15.0, a partial dispersion ratio $\theta gF$ of 0.748, and an abnormal partial dispersion $\Delta\theta gF$ of 0.0939.

The refractive surface closest to the image of the negative lens G5 closest to the image in the first lens unit L1 in this first embodiment has a radius of curvature Rp of 24.60, and the refractive surface closest to the object of the negative lens G6 closest to the object in the second lens unit L2 has a radius of curvature Rn of −27.49.

The numerical values corresponding to the conditional expression (1) of the materials of the positive lenses G2, G3, and G4 in the first embodiment are 0.0120, 0.0120, and 0.0939, respectively, which satisfy the conditional expression (1). In addition, the material of the positive lens G4 satisfies the conditional expression (2). The values corresponding to the conditional expressions (3) and (4) are 0.29 and −0.32 respectively, and the numerical value that corresponds to the conditional expression (5) is 35.2.

The ratio of the Abbe number vd that corresponds to the conditional expression (6) is 4.51. A minimum Abbe number and a minimum refractive index that correspond to the conditional expressions (7) and (8) are 15.0 and 1.595. The value made by dividing the focal length of the airy lens that corresponds to the conditional expression (9) by the focal length of the overall system is −0.14. The F-number Fno that corresponds to the conditional expression (10) is 1.24, and the amount corresponding to the conditional expression (11) that defines a condition of correcting the chromatic aberration is $3.31 \times 10^{-3}$. The half angle of view $\omega$ of the conditional expression (12) is 14.28°.

The first lens unit L1 of the first embodiment includes a positive lens made of a low dispersion glass material and having a comparatively high abnormal partial dispersion advantageous to the correction of the chromatic aberration, and a positive lens made of a high dispersion glass material and having a considerably high abnormal partial dispersion. Then, the correction of each chromatic aberration is allotted within the appropriate range. This configuration can properly correct a variety of aberrations, such as a chromatic aberration, a spherical aberration, and a curvature of field, which are likely to stand out in the lens having a high numerical aperture and an intermediate focal length as understood from the longitudinal aberrational diagram illustrated in FIG. 2 although the numerical aperture is as high as 1.24.

Second Embodiment

A description will be given of an optical system OL according to a second embodiment illustrated in FIG. 3. The optical system OL according to the second embodiment includes a lens having a high numerical aperture and an intermediate focal length. The optical system OL illustrated in FIG. 3 includes, in order from the object side to the image side, a front unit LF having a positive refractive power, an aperture diaphragm SP, and a rear unit LR having a positive refractive power. The front unit LF includes a first lens unit L1 having a positive refractive power. The rear unit LR includes a second lens unit L2 having a positive refractive power and a third lens unit L3 having a positive refractive power.

In focusing from the infinite object to the near object, the second lens unit L2 is moved to the object side. The first lens unit L1, the aperture diaphragm SP, and the third lens unit L3 are fixed in this case.

The first lens unit L1 includes four positive lenses G1, G2, G3, and G4 and one negative lens G5. The focal length of the first lens unit L1 is 143.34 (mm).

The entire system has a focal length of 83.30 mm, a numerical aperture (Fno) of 1.80, and half an angle of view of 14.56°.

The focal lengths of the positive lenses G1, G2, G3, and G4 in the first lens unit L1 are 322.76, 111.18, 89.49, and 213.09, respectively. The glass material of the positive lens G1 is S-TIH53 (trade name made by OHARA Inc.), the refractive index Nd to the d-line is 1.847, and the Abbe number vd is 23.8. The partial dispersion ratio $\theta gF$ is 0.620, and the abnormal partial dispersion $\Delta\theta gF$ is 0.0000.

The positive lens G2 is made of a glass material K-GFK68 (trade name made by Sumita Optical Glass Inc.), has a refractive index Nd to the d-line of 1.592, and the Abbe number of 68.3. The partial dispersion ratio $\theta gF$ is 0.546, and the abnormal partial dispersion $\Delta\theta gF$ is 0.0139. The positive lens G3 is made of a glass material S-LAL18 (trade name made by OHARA Inc.), has a refractive index Nd to the d-line of 1.729, and the Abbe number of 54.7. The partial dispersion ratio $\theta gF$ is 0.544 and the abnormal partial dispersion $\Delta\theta gF$ is −0.0027.

The positive lens G4 is made by hardening above N-polyvinyl carbazole. This material has a refractive index Nd of 1.696, and an Abbe number vd of 17.7. A partial dispersion ratio $\theta gF$ of 0.686, and an abnormal partial dispersion $\Delta\theta gF$ of 0.0425.

The refractive surface closest to the image of the negative lens G5 closest to the image in the first lens unit L1 in this second embodiment has a radius of curvature Rp of 25.85, and the refractive surface closest to the object of the negative lens G6 closest to the object in the second lens unit L2 has a radius of curvature Rn of −28.75.

The numerical values corresponding to the conditional expression (1) of the materials of the positive lenses G2 and G4 in the second embodiment are 0.0139 and 0.0425, respectively, which satisfy the conditional expression (1). In addition, the material of the positive lens G4 satisfies the conditional expression (2). The values corresponding to the conditional expressions (3) and (4) are 0.31 and −0.35 respectively, and the numerical value that corresponds to the conditional expression (5) is 11.8.

The ratio of the Abbe number vd that corresponds to the conditional expression (6) is 3.86. A minimum Abbe number and a minimum refractive index that correspond to the conditional expressions (7) and (8) are 17.7 and 1.592. The value made by dividing the focal length of the airy lens that corresponds to the conditional expression (9) by the focal length of the overall system is −0.15. The F-number Fno that corresponds to the conditional expression (10) is 1.80, and the amount corresponding to the conditional expression (11) that defines a condition of correcting the chromatic aberration is $1.80 \times 10^{-3}$. The half angle of view $\omega$ of the conditional expression (12) is 14.56°.

The first lens unit L1 in the second embodiment includes a positive lens made of a low dispersion glass material and having a comparatively high abnormal partial dispersion advantageous to the correction of the chromatic aberration, and a positive lens made of a high dispersion glass material and having a considerably high abnormal partial dispersion. Then, the correction of each chromatic aberration is allotted within the appropriate range. This configuration can properly correct a variety of aberrations, such as a chromatic aberration, a spherical aberration, and a curvature of field, which are likely to stand out in the lens having a high numerical aperture and an intermediate focal length as understood from the longitudinal aberrational diagram illustrated in FIG. 4 although the numerical aperture is as high as 1.80.

Third Embodiment

A description will be given of an optical system OL according to a third embodiment illustrated in FIG. 5. The optical system OL according to the third embodiment includes a lens having a high numerical aperture and an intermediate focal length. The optical system OL illustrated in FIG. 5 includes, in order from the object side to the image side, a front unit LF having a positive refractive power, an aperture diaphragm SP, and a rear unit LR having a positive refractive power. The front unit LF includes a first lens unit L1 having a positive refractive power. The rear unit LR includes a second lens unit L2 having a positive refractive power and a third lens unit L3 having a negative refractive power.

In focusing from the infinite object to the near object, the second lens unit L2 is moved to the object side. The first lens unit L1, the aperture diaphragm SP, and the third lens unit L3 are fixed in this case.

The first lens unit L1 includes four positive lenses G1, G2, G3, and G4 and one negative lens G5. The focal length of the first lens unit L1 is 184.49.

The focal length of the entire system is 132.30 mm, the numerical aperture (Fno) is 2.06, and the half angle of view $\omega$ is 9.29°.

The focal lengths of the positive lenses G1, G2, G3, and G4 in the first lens unit L1 are 496.33, 145.78, 112.71, and 180.46, respectively. The glass material of the positive lens G1 is S-NBH55 (trade name made by OHARA Inc.), the refractive index Nd to the d-line is 1.800, and the Abbe number vd is 29.8. The partial dispersion ratio $\theta gF$ is 0.602, and the abnormal partial dispersion $\Delta\theta gF$ is 0.0006.

The positive lens G2 is made of FCD505 (trade name made by HOYA Corporation), has a refractive index Nd to the d-line of 1.593, and an Abbe number of 68.6. The partial dispersion ratio $\theta gF$ is 0.545, and the abnormal partial dispersion $\Delta\theta gF$ is 0.0132. The positive lens G3 is made of S-LAL14 (trade name made by OHARA Inc.), has a refractive index Nd to the d-line of 1.697, and the Abbe number of 55.5. The partial dispersion ratio $\theta gF$ is 0.543 and the abnormal partial dispersion $\Delta\theta gF$ is −0.0027.

The positive lens G4 is made by hardening above acrylic UV curing resin. This material has a refractive index Nd of 1.636 and an Abbe number vd of 22.7. A partial dispersion ratio $\theta gF$ of 0.689, and an abnormal partial dispersion $\Delta\theta gF$ of 0.0650.

The refractive surface closest to the image of the negative lens G5 closest to the image in the first lens unit L1 in this third embodiment has a radius of curvature Rp of 32.38, and the refractive surface closest to the object of the negative lens G6 closest to the object in the second lens unit L2 has a radius of curvature Rn of −36.01.

The numerical values corresponding to the conditional expression (1) of the materials of the positive lenses G2 and G4 in the third embodiment are 0.0132 and 0.0650, respectively, which satisfy the conditional expression (1). In addition, the material of the positive lens G4 satisfies the conditional expression (2). The values corresponding to the conditional expressions (3) and (4) are 0.24 and −0.27 respectively, and the numerical value that corresponds to the conditional expression (5) is 14.8.

The ratio of the Abbe number νd that corresponds to the conditional expression (6) is 3.02. A minimum Abbe number and a minimum refractive index that correspond to the conditional expressions (7) and (8) are 22.7 and 1.593. The value made by dividing the focal length of the airy lens that corresponds to the conditional expression (9) by the focal length of the overall system is −0.12. The F-number Fno that corresponds to the conditional expression (10) is 2.06, and the amount corresponding to the conditional expression (11) is $3.10 \times 10^{-3}$. The half angle of view ω of the conditional expression (12) is 9.29°.

The first lens unit L1 in the third embodiment includes a positive lens made of a low dispersion glass material and having a comparatively high abnormal partial dispersion advantageous to the correction of the chromatic aberration, and a positive lens made of a high dispersion glass material and having a considerably high abnormal partial dispersion. Then, the correction of each chromatic aberration is allotted within the appropriate range. This configuration can properly correct a variety of aberrations, such as a chromatic aberration, a spherical aberration, and a curvature of field, which are likely to stand out in the lens having a high numerical aperture and an intermediate focal length as understood from the longitudinal aberrational diagram illustrated in FIG. 6 although the numerical aperture is as high as 2.06.

Fourth Embodiment

A description will be given of an optical system OL according to a fourth embodiment illustrated in FIG. 7. The optical system OL according to the fourth embodiment includes a lens having a high numerical aperture and an intermediate focal length. The optical system OL illustrated in FIG. 7 includes, in order from the object side to the image side, a front unit LF having a positive refractive power, an aperture diaphragm SP, and a rear unit LR having a positive refractive power. The front unit LF includes a first lens unit L1 having a positive refractive power. The rear unit LR includes a second lens unit L2 having a positive refractive power.

In focusing from the infinite object to the near object, all of the first lens unit L1, the aperture diaphragm SP, and the second lens unit L2 are moved to the object side.

The first lens unit L1 includes three positive lenses G1, G2, and G4 and two negative lenses G3 and G5. The focal length of the first lens unit L1 is 190.28 (mm).

The entire system has a focal length of 51.70 mm, a numerical aperture (Fno) of 1.41, and half an angle of view of 22.71°.

The focal lengths of the positive lenses G1, G2, and G4 in the first lens unit L1 are 74.35, 105.97, and 219.80, respectively. The R1 surface of the positive lens G4 (which is a lens surface on the object side) has an aspheric shape. The glass material of the positive lens G1 is made of S-LAH65 (trade name made by OHARA Inc.), the refractive index Nd to the d-line is 1.804, and the Abbe number νd is 46.6. The partial dispersion ratio θgF is 0.557, and the abnormal partial dispersion ΔθgF is 0.0034.

The positive lens G2 is made of FCD505 (trade name made by HOYA Corporation), has a refractive index Nd to the d-line of 1.593, and an Abbe number of 68.6. The partial dispersion ratio θgF is 0.545 and the abnormal partial dispersion ΔθgF is 0.0132. The positive lens G4 is made by hardening the organic compound containing the above nanoparticle dispersion material which is made by mixing $TiO_2$ nanoparticles in fluorine resin with a volume ratio of 9%. This material has a refractive index Nd of 1.757 and an Abbe number νd of 16.1. A partial dispersion ratio θgF of 0.711, and an abnormal partial dispersion ΔθgF of 0.0613.

The refractive surface closest to the image of the negative lens G5 closest to the image in the first lens unit L1 in the fourth embodiment has a radius of curvature Rp of 28.15, and the refractive surface closest to the object of the negative lens G6 closest to the object in the second lens unit L2 has a radius of curvature Rn of −15.62.

The numerical values corresponding to the conditional expression (1) of the materials of the positive lenses G2 and G4 in the fourth embodiment are 0.0132 and 0.0613, respectively, which satisfy the conditional expression (1). In addition, the material of the positive lens G4 satisfies the conditional expression (2). The values corresponding to the conditional expressions (3) and (4) are 0.54 and −0.30 respectively, and the numerical value that corresponds to the conditional expression (5) is 19.7.

The ratio of the Abbe number νd that corresponds to the conditional expression (6) is 4.26. A minimum Abbe number and a minimum refractive index that correspond to the conditional expressions (7) and (8) are 16.1 and 1.593. The value made by dividing the focal length of the airy lens that corresponds to the conditional expression (9) by the focal length of the overall system is −0.21. The F-number Fno that corresponds to the conditional expression (10) is 1.41, and the amount corresponding to the conditional expression (11) is $3.45 \times 10^{-3}$. The half angle of view ω of the conditional expression (12) is 22.71°.

The first lens unit L1 in the fourth embodiment includes a positive lens made of a low dispersion glass material and having a comparatively high abnormal partial dispersion advantageous to the correction of the chromatic aberration, and a positive lens made of a high dispersion glass material and having a considerably high abnormal partial dispersion. Then, the correction of each chromatic aberration is allotted within the appropriate range. This configuration properly corrects a variety of aberrations, such as a chromatic aberration, a spherical aberration, and a curvature of field, which are likely to stand out in the lens having a high numerical aperture and an intermediate focal length as understood from the longitudinal aberrational diagram illustrated in FIG. 8 although the numerical aperture is as high as 1.41.

Referring now to FIG. 9, a description will be given of an embodiment of a digital still camera (optical apparatus) using an optical system according to one of the above embodiments. In FIG. 9, reference numeral 20 denotes a camera body, and reference numeral 21 denotes an image pickup optical system that includes the optical system according to one of the above embodiments. Reference numeral 22 denotes a solid-state image sensor (photoelectric conversion element), such as a CCD sensor and a CMOS sensor, which is configured to photoelectrically convert an object image formed by the image pickup optical system 21. Reference numeral 23 denotes a memory configured to store information corresponding to an object image photoelectrically converted by the solid-state image sensor 22. Reference numeral 24 denotes a viewfinder used to observe the object image formed on the solid-state image sensor 22 and including a liquid crystal display panel.

Thus, an optical apparatus having a small configuration and high optical performance is realized by applying the optical system according to one of the above embodiments to the optical apparatus, such as a digital still camera.

The optical system according to one of the above embodiments is applicable to an image pickup apparatus, such as an exchange lens for a single-lens reflex camera of a mirror type or a mirror-less type.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Specific numerical data of optical systems according to numerical examples 1 to 4 will now be illustrated. "i" denotes the order from the object. The surface number "i" is counted in order from the object side. "Ri" is a radius of curvature (mm), and "Di" is a surface interval (separation) (mm) between the i-th surface and the (i+1)-th surface. "Ndi" and "vdi" are the refractive index and Abbe number of the medium between the i-th surface and the (i+1)-th surface to the d-line. "θgFi" is a partial dispersion value of the medium between the i-th surface and the (i+1)-th surface. "BF" is a back focus, and the lens overall length represents a distance from the first lens surface to the image plane.

The aspheric surface is represented by adding a code of asterisk * to the end of the surface number. The aspheric shape is expressed as follows where is a displacement amount from the surface vertex in the optical axis direction, "h" is a height from the optical axis in the direction perpendicular to the optical axis, is a paraxial radius of curvature, "K" is a cone constant, and "B," "C," "D," "E," . . . are aspheric coefficients of each order:

$$X(h) = \frac{(1/r)h^2}{1 + \sqrt{\{1 - (1+K)(h/r)^2\}}} + Bh^4 + Ch^6 + Dh^8 + Eh^{10} \ldots$$

"E±XX" in each aspheric coefficient means "×10±XX." In the unit data, the aperture diaphragm is expressed as one unit (second unit), and the number of units of each embodiment is increased by one. Table 1 indicates numerical values corresponding to the respective conditional expressions. Table 2 indicates optical constants of the organic compounds used for the first to fourth embodiments. Table 3 indicates an optical constant of each of fluorene resin, acrylic resin, and $TiO_2$ in the nanoparticle dispersion material used for the first and fourth embodiments.

Numerical Example 1

| Unit mm | | | | | |
|---|---|---|---|---|---|
| surface number | R | D | Nd | vd | light flux effective diameter |
| 1 | 131.811 | 4.83 | 1.84666 | 23.8 | 68.55 |
| 2 | 449.845 | 0.15 | | | 68.16 |
| 3* | 48.334 | 13.30 | 1.59522 | 67.7 | 64.52 |
| 4 | 129.402 | 0.15 | | | 60.80 |
| 5 | 44.370 | 15.42 | 1.59522 | 67.7 | 54.65 |
| 6 | 294.068 | 0.88 | 1.76499 | 15.0 | 46.23 |
| 7 | 1408.144 | 2.25 | 1.84666 | 23.8 | 46.06 |
| 8 | 24.597 | 14.12 | | | 35.90 |
| 9(diaphragm) | ∞ | 8.99 | | | 33.98 |
| 10 | −27.489 | 3.84 | 1.76182 | 26.5 | 32.92 |
| 11 | 132.719 | 10.50 | 1.91082 | 35.3 | 37.82 |
| 12 | −43.321 | 0.15 | | | 39.56 |
| 13 | 253.916 | 3.58 | 1.90366 | 31.3 | 38.67 |
| 14 | −97.609 | 0.99 | | | 38.53 |
| 15 | 198.461 | 1.54 | 1.65412 | 39.7 | 38.57 |
| 16 | 62.998 | 3.52 | 1.72916 | 54.7 | 38.85 |
| 17 | 763.404 | 38.35 | | | 38.88 |
| image plane | ∞ | | | | |

| aspheric data | | | |
|---|---|---|---|
| | cone coefficient (K) | fourth coefficient (B) | sixth coefficient (C) |
| third surface | 0.00000E+00 | −3.80413E−09 | 2.51918E−11 |
| | eighth coefficient (D) | tenth coefficient (E) | |
| third surface | −4.18559E−14 | 3.29624E−17 | |

| various data | |
|---|---|
| focal length | 85.00 |
| Fno | 1.24 |
| image height | 21.64 |
| lens overall length | 122.56 |
| BF | 38.35 |
| incident pupil position | 87.06 |
| exit pupil position | −42.49 |
| front principal point position | 82.69 |
| back principal point position | −46.65 |

| unit data | | | | | |
|---|---|---|---|---|---|
| unit | starting surface | focal length | lens length | front principal point position | back principal point position |
| 1 | 1 | 201.74 | 36.98 | −117.24 | −87.39 |
| 2 | 9 | ∞ | 0 | 0 | 0 |
| 3 | 10 | 70.21 | 18.07 | 19.48 | 14.07 |
| 4 | 15 | 282.49 | 5.07 | −0.49 | −3.45 |

| single lens data | | |
|---|---|---|
| lens | starting surface | focal length |
| 1 | 1 | 218.680 |
| 2 | 3 | 122.140 |
| 3 | 5 | 85.810 |
| 4 | 6 | 485.710 |
| 5 | 7 | −29.590 |
| 6 | 10 | −29.590 |
| 7 | 11 | 36.910 |
| 8 | 13 | 78.400 |
| 9 | 15 | −141.740 |
| 10 | 16 | 93.970 |

Numerical Example 2

| Unit mm | | | | | |
|---|---|---|---|---|---|
| surface number | R | D | Nd | vd | light flux effective diameter |
| 1 | 102.902 | 2.53 | 1.84666 | 23.8 | 46.28 |
| 2 | 163.192 | 0.15 | | | 45.96 |
| 3 | 43.649 | 5.86 | 1.59240 | 68.3 | 45.24 |
| 4 | 122.954 | 1.73 | | | 44.42 |
| 5 | 40.248 | 9.19 | 1.72916 | 54.7 | 41.11 |
| 6 | 94.917 | 1.30 | 1.69591 | 17.7 | 36.60 |
| 7 | 262.229 | 2.70 | 1.80518 | 25.4 | 36.47 |

-continued

| Unit mm | | | | |
|---|---|---|---|---|
| 8 | 25.845 | 8.06 | | 30.72 |
| 9(diaphragm) | ∞ | 20.75 | | 29.71 |
| 10 | −28.746 | 2.40 | 1.72825 28.5 | 27.55 |
| 11 | −137.398 | 1.08 | | 29.22 |
| 12 | −63.671 | 8.56 | 1.88300 40.8 | 29.28 |
| 13 | −36.024 | 0.15 | | 32.13 |
| 14 | 96.577 | 4.60 | 1.77250 49.6 | 35.77 |
| 15 | −115.161 | 1.50 | | 36.15 |
| 16 | −135.342 | 1.90 | 1.62588 35.7 | 36.50 |
| 17 | 70.730 | 4.54 | 1.88300 40.8 | 37.82 |
| 18 | −389.950 | 39.11 | | 38.00 |
| image plane | ∞ | | | |

| various data | |
|---|---|
| focal length | 83.30 |
| Fno | 1.80 |
| image height | 21.64 |
| lens overall length | 116.11 |
| BF | 39.11 |
| incident pupil position | 38.08 |
| exit pupil position | −89.87 |
| front principal point position | 67.59 |
| back principal point position | −44.19 |

| unit data | | | | | |
|---|---|---|---|---|---|
| unit | starting surface | focal length | lens length | front principal point position | back principal point position |
| 1 | 1 | 143.34 | 23.46 | −44.35 | −44.27 |
| 2 | 9 | ∞ | 0 | 0 | 0 |
| 3 | 10 | 76.85 | 16.79 | 20.63 | 15.47 |
| 4 | 16 | 762.02 | 6.44 | 9.39 | 5.9 |

| single lens data | | |
|---|---|---|
| lens | starting surface | focal length |
| 1 | 1 | 322.760 |
| 2 | 3 | 111.180 |
| 3 | 5 | 89.490 |
| 4 | 6 | 213.090 |
| 5 | 7 | −35.790 |
| 6 | 10 | −50.390 |
| 7 | 12 | 82.040 |
| 8 | 14 | 68.650 |
| 9 | 16 | −73.960 |
| 10 | 17 | 68.120 |

Numerical Example 3

| Unit mm | | | | | |
|---|---|---|---|---|---|
| surface number | R | D | Nd | vd | light flux effective diameter |
| 1 | 163.099 | 5.26 | 1.80000 | 29.8 | 67.97 |
| 2 | 272.833 | 3.17 | | | 66.57 |
| 3 | 59.399 | 10.80 | 1.59282 | 68.6 | 62.19 |
| 4 | 177.117 | 14.29 | | | 59.83 |
| 5 | 44.158 | 6.47 | 1.69680 | 55.5 | 48.00 |
| 6 | 94.800 | 2.50 | 1.63555 | 22.7 | 46.04 |
| 7 | 541.026 | 4.00 | 1.80518 | 25.4 | 45.90 |
| 8 | 32.380 | 9.17 | | | 38.04 |
| 9(diaphragm) | ∞ | 34.35 | | | 36.94 |
| 10 | −36.014 | 2.50 | 1.69895 | 30.1 | 29.58 |
| 11 | −160.612 | 2.52 | | | 30.88 |
| 12 | −72.736 | 7.97 | 1.83481 | 42.7 | 31.36 |
| 13 | −41.856 | 0.15 | | | 33.90 |

-continued

| Unit mm | | | | | |
|---|---|---|---|---|---|
| 14 | 105.321 | 6.96 | 1.77250 | 49.6 | 36.91 |
| 15 | −194.340 | 1.50 | | | 37.54 |
| 16 | −2009.882 | 2.50 | 1.48749 | 70.2 | 37.78 |
| 17 | 68.030 | 5.33 | 1.83400 | 37.2 | 38.19 |
| 18 | 136.664 | 43.23 | | | 38.00 |
| image plane | ∞ | | | | |

| various data | |
|---|---|
| focal length | 132.30 |
| Fno | 2.06 |
| image height | 21.64 |
| lens overall length | 162.67 |
| BF | 43.23 |
| incident pupil position | 76.58 |
| exit pupil position | −108.62 |
| front principal point position | 93.61 |
| back principal point position | −89.07 |

| unit data | | | | | |
|---|---|---|---|---|---|
| unit | starting surface | focal length | lens length | front principal point position | back principal point position |
| 1 | 1 | 184.49 | 46.49 | −64.44 | −70.75 |
| 2 | 9 | ∞ | 0 | 0 | 0 |
| 3 | 10 | 102.4 | 20.09 | 24.58 | 16.84 |
| 4 | 16 | −857.7 | 7.83 | 16.55 | 11.76 |

| single lens data | | |
|---|---|---|
| lens | starting surface | focal length |
| 1 | 1 | 496.330 |
| 2 | 3 | 145.780 |
| 3 | 5 | 112.710 |
| 4 | 6 | 180.460 |
| 5 | 7 | −42.930 |
| 6 | 10 | −66.970 |
| 7 | 12 | 105.700 |
| 8 | 14 | 89.320 |
| 9 | 16 | −134.930 |
| 10 | 17 | 156.880 |

Numerical Example 4

| Unit mm | | | | | |
|---|---|---|---|---|---|
| surface number | R | D | Nd | vd | light flux effective diameter |
| 1 | 43.261 | 4.18 | 1.80400 | 46.6 | 37.17 |
| 2 | 149.853 | 0.27 | | | 36.20 |
| 3 | 33.837 | 5.56 | 1.59282 | 68.6 | 34.13 |
| 4 | 68.850 | 2.53 | | | 31.97 |
| 5 | 68.154 | 2.04 | 1.69895 | 30.1 | 29.80 |
| 6 | 22.440 | 1.89 | | | 26.38 |
| 7* | 34.639 | 0.69 | 1.75728 | 16.1 | 26.33 |
| 8 | 43.364 | 1.29 | 1.66680 | 33.0 | 26.25 |
| 9 | 28.154 | 4.96 | | | 25.12 |
| 10(diaphragm) | ∞ | 9.28 | | | 24.69 |
| 11 | −15.623 | 1.46 | 1.80518 | 25.4 | 23.89 |
| 12 | −166.750 | 7.09 | 1.83481 | 42.7 | 29.18 |
| 13 | −24.619 | 0.15 | | | 31.01 |
| 14 | −75.475 | 2.61 | 1.88300 | 40.8 | 31.98 |
| 15 | −39.557 | 0.15 | | | 32.27 |

-continued

Unit mm

| | | | | | |
|---|---|---|---|---|---|
| 16 | 165.083 | 4.76 | 1.72916 | 54.7 | 34.75 |
| 17 | −60.207 | 38.94 | | | 35.19 |
| image plane | ∞ | | | | | aspheric data

| | cone coefficient (K) | fourth coefficient (B) | sixth coefficient (C) |
|---|---|---|---|
| seventh surface | 0.00000E+00 | −2.16382E−06 | 8.47733E−09 |

| | eighth coefficient (D) | tenth coefficient (E) |
|---|---|---|
| seventh surface | −5.16134E−11 | 3.36180E−13 | various data

| | |
|---|---|
| focal length | 51.70 |
| Fno | 1.41 |
| image height | 21.64 |
| lens overall length | 87.84 |
| BF | 38.94 |
| incident pupil position | 28.57 |
| exit pupil position | −48.99 |

Unit mm

| | |
|---|---|
| front principal point position | 49.87 |
| back principal point position | −12.76 | unit data

| unit | starting surface | focal length | lens length | front principal point position | back principal point position |
|---|---|---|---|---|---|
| 1 | 1 | 190.28 | 18.45 | −58.33 | −54.7 |
| 2 | 10 | ∞ | 0 | 0 | 0 |
| 3 | 11 | 39.86 | 16.22 | 14.49 | 9.9 | single lens data

| lens | starting surface | focal length |
|---|---|---|
| 1 | 1 | 74.350 |
| 2 | 3 | 105.970 |
| 3 | 5 | −48.760 |
| 4 | 7 | 219.800 |
| 5 | 8 | −124.590 |
| 6 | 11 | −21.500 |
| 7 | 12 | 33.830 |
| 8 | 14 | 91.030 |
| 9 | 16 | 61.050 |

TABLE 1

| | First Embodiment | Second Embodiment | Third Embodiment | Fourth Embodiment |
|---|---|---|---|---|
| νd1 | 23.8(G1) | 23.8(G1) | 29.8(G1) | 46.6(G1) |
| νd2 | 67.7(G2) | 68.3(G2) | 68.6(G2) | 68.6(G2) |
| νd3 | 67.7(G3) | 54.7(G3) | 55.5(G3) | 16.1(G4) |
| νd4 | 15.0(G4) | 17.7(G4) | 22.7(G4) | — |
| N1 | 1.84666(G1) | 1.84666(G1) | 1.80000(G1) | 1.80400(G1) |
| N2 | 1.59522(G2) | 1.59240(G2) | 1.59282(G2) | 1.59282(G2) |
| N3 | 1.59522(G3) | 1.72916(G3) | 1.69680(G3) | 1.75728(G4) |
| N4 | 1.76499(G4) | 1.69591(G4) | 1.63555(G4) | — |
| θgF1 | 0.620(G1) | 0.620(G1) | 0.602(G1) | 0.557(G1) |
| θgF2 | 0.544(G2) | 0.546(G2) | 0.545(G2) | 0.545(G2) |
| θgF3 | 0.544(G3) | 0.544(G3) | 0.543(G3) | 0.711(G4) |
| θgF4 | 0.748(G4) | 0.686(G4) | 0.689(G4) | — |
| ΔθgF1 | 0.0000(G1) | 0.0000(G1) | 0.0006(G1) | −0.0034(G1) |
| ΔθgF2 | 0.0120(G2) | 0.0139(G2) | 0.0132(G2) | 0.0132(G2) |
| ΔθgF3 | 0.0120(G3) | −0.0027(G3) | −0.0027(G3) | 0.0613(G4) |
| ΔθgF4 | 0.0939(G4) | 0.0425(G4) | 0.0650(G4) | — |
| f1 | 218.68(G1) | 322.76(G1) | 496.33(G1) | 74.35(G1) |
| f2 | 122.14(G2) | 111.18(G2) | 145.78(G2) | 105.97(G2) |
| f3 | 85.81(G3) | 89.49(G3) | 112.71(G3) | 219.80(G4) |
| f4 | 485.71(G4) | 213.09(G4) | 180.46(G4) | — |
| ftotal | 85.00 | 83.30 | 132.30 | 51.70 |
| fp | 201.74 | 143.34 | 184.49 | 190.28 |
| fair | −11.88 | −12.62 | −15.32 | −10.80 |
| Rp | 24.60 | 25.85 | 32.38 | 28.15 |
| Rn | −27.49 | −28.75 | −36.01 | −15.62 |
| Conditional expression (1) ΔθgF | 0.0120(G2, 3) | 0.0139(G2) | 0.0132(G2) | 0.0132(G2) |
| Conditional expression (2) ΔθgF | 0.0939(G4) | 0.0425(G4) | 0.0650(G4) | 0.0613(G4) |
| Conditional expression (3) Rp/ftotal | 0.29 | 0.31 | 0.24 | 0.54 |
| Conditional expression (4) Rn/ftotal | −0.32 | −0.35 | −0.27 | −0.30 |
| Conditional expression (5) (ΔθgFm1/νdm1)/(ΔθgFm2/νdm2) | 35.2 | 11.8 | 14.8 | 19.7 |

TABLE 1-continued

|  | First Embodiment | Second Embodiment | Third Embodiment | Fourth Embodiment |
|---|---|---|---|---|
| Conditional expression (6) max(νd)/min(νd) | 4.51 | 3.86 | 3.02 | 4.26 |
| Conditional expression (7) min(νd) | 15.0 | 17.7 | 22.7 | 16.1 |
| Conditional expression (8) min(Nd) | 1.59522 | 1.59240 | 1.59282 | 1.59282 |
| Conditional expression (9) fair/ftotal | −0.14 | −0.15 | −0.12 | −0.21 |
| Conditional expression (10) Fno | 1.24 | 1.80 | 2.06 | 1.41 |
| Conditional expression (11) $\Sigma(\Delta\theta gFi/\nu di) \times (fp/fi)$ | $3.31 \times 10^{-3}$ | $1.80 \times 10^{-3}$ | $3.10 \times 10^{-3}$ | $3.45 \times 10^{-3}$ |
| Conditional expression (12) ω(times) | 14.28 | 14.56 | 9.29 | 22.71 |

TABLE 2

|  | First Embodiment | Second Embodiment | Third Embodiment | Fourth Embodiment |
|---|---|---|---|---|
|  | $TiO_2$ 15% - Acrylic resin | N-polyvinyl carbazole | Acrylic UV curing resin | $TiO_2$ 9% - Fluorene resin |
| d-line refractive index | 1.76498 | 1.69591 | 1.63272 | 1.75728 |
| g-line refractive index | 1.84098 | 1.75164 | 1.67117 | 1.82531 |
| C-line refractive index | 1.75182 | 1.68528 | 1.62517 | 1.74478 |
| F-line refractive index | 1.80283 | 1.72465 | 1.65264 | 1.79185 |
| νd | 15.0 | 17.7 | 23.0 | 16.1 |
| θgF | 0.748 | 0.686 | 0.675 | 0.711 |
| ΔθgF | 0.0939 | 0.0424 | 0.0515 | 0.0612 |

TABLE 3

|  | $TiO_2$ | Fluorene resin | Acrylic resin |
|---|---|---|---|
| d-line refractive index | 2.75753 | 1.62524 | 1.52415 |
| g-line refractive index | 3.03431 | 1.65852 | 1.53706 |
| C-line refractive index | 2.71051 | 1.61825 | 1.52116 |
| F-line refractive index | 2.89478 | 1.64302 | 1.53133 |
| νd | 9.5 | 25.2 | 51.6 |
| θgF | 0.757 | 0.626 | 0.563 |

This application claims the benefit of Japanese Patent Application No. 2011-261634, filed Nov. 30, 2011 which is hereby incorporated by reference herein in its entirety.

What is claimed is:

1. An optical system comprising, in order from an object side to an image side, a front unit having a positive refractive power, an aperture diaphragm, and a rear unit, wherein the front unit includes a first lens unit having a positive refractive power, the rear unit includes a second lens unit adjacent to the aperture diaphragm and configured to move in focusing, and the first lens unit includes n (which is an integer equal to or larger than 2) positive lenses and one or more negative lenses, wherein materials of at least two positive lenses of the n positive lenses in the first lens unit satisfy the following conditional expression:

$$0.0100 < \Delta\theta gF$$

where $\Delta\theta gF$ is an abnormal partial dispersion of each material, wherein the material of one or more positive lenses of the n positive lenses in the first lens unit satisfies the following conditional expression:

$$0.0272 < \Delta\theta gF$$

wherein the following conditional expressions are satisfied:

$$0.15 < Rp/ftotal < 0.90$$

$$-15.00 < Rn/ftotal < -0.15$$

where Rp denotes a radius of curvature of a refractive surface that is concave and closest to an image in the first lens unit, Rn denotes a radius of curvature of a refractive surface that is concave and closest to an object in the second lens unit, and ftotal is a focal length of an entire optical system.

2. The optical system according to claim 1, wherein there is a combination that satisfies the following conditional expression:

$$5.0 < (\Delta\theta Fm1/\nu dm1)/(\Delta\theta Fm2/\nu dm2) < 50.0$$

$$1 \leq m1 \leq n, 1 \leq m2 \leq n, \text{ and } 0.0 < \Delta\theta Fm2/\nu dm2 < \Delta\theta Fm1/\nu dm1$$

where i is an order counted from the object side, $\Delta\theta gFi$ (i=1, 2, . . . , n) is an abnormal partial dispersion of an material of an i-th positive lens in the first lens unit, and $\nu di$ (i =1, 2, ..., n) is an Abbe number of the material of the i-th positive lens in the first lens unit.

3. The optical system according to claim 1, wherein the following conditional expressions are satisfied:

$$2.2 < \max(\nu d)/\min(\nu d)$$

$$\min(\nu d) < 30.0$$

where max($\nu d$) and min($\nu d$) are maximum and minimum values of an Abbe number of the material of a positive lens of the n positive lenses in the first lens unit.

4. The optical system according to claim 1, where the following conditional expression is satisfied:

$$1.55 < \min(Nd)$$

where min(Nd) is a minimum value of the refractive index of the material of a positive lens of the n positive lenses in the first lens unit.

5. The optical system according to claim 1, wherein the following conditional expression is satisfied:

$$-0.900 < fair/ftotal < -0.100$$

where fair is a focal length of an airy lens between the refractive surface closest to the image in the first lens unit and the refractive surface closest to the object in the second lens unit.

6. The optical system according to claim 1, wherein the following conditional expression is satisfied:

$$Fno < 2.5$$

where Fno is a numerical aperture of the optical system that focuses on an infinite object.

7. The optical system according to claim 1, wherein the following conditional expression is satisfied:

$$5.00 \times 10^{-4} < \Sigma(\Delta\theta gFi/\nu di) \times (fp/fi)$$

where fp is a focal length of the first lens unit, i is an order counted from the object side, fi (i =1, 2, ..., n) and $\nu di$ (i =1, 2, ..., n) are a focal length and an Abbe number of a material of an i-th positive lens in the first lens unit.

8. The optical system according to claim 1, wherein one of the at least two positive lenses is made of an organic compound and one of the at least two positive lenses is made of an inorganic compound.

9. The optical system according to claim 1, wherein the optical system forms an image on a photoelectrical conversion element.

10. The optical system according to claim 1, wherein n =4.

11. The optical system according to claim 10, wherein in the case where the n positive lenses comprise lenses G1, G2, G3, and G4, then lenses G2, G3, and G4 satisfy $0.0100 < \Delta\theta gF$, and lens G4 satisfies $0.0272 < \Delta\theta gF$.

12. The optical system according to claim 10, wherein in the case where the n positive lenses comprise lenses G1, G2, G3, and G4, then lenses G2 and G4 satisfy $0.0100 < \Delta\theta gF$, and lens G4 satisfies $0.0272 < \Delta\theta gF$.

13. An optical apparatus comprising:
an optical system including, in order from an object side to an image side, a front unit having a positive refractive power, an aperture diaphragm, and a rear unit; and
a photoelectrical conversion element configured to photoelectrically convert an image formed by the optical system,
wherein the front unit includes a first lens unit having a positive refractive power, the rear unit includes a second lens unit adjacent to the aperture diaphragm and configured to move in focusing, and the first lens unit includes n (which is an integer equal to or larger than 2) positive lenses and one or more negative lenses,
wherein materials of at least two positive lenses of the n positive lenses in the first lens unit satisfy the following conditional expression:

$$0.0100 < \Delta\theta gF$$

where $\Delta\theta gF$ is an abnormal partial dispersion of each material,
wherein the material of one or more positive lenses of the n positive lenses in the first lens unit satisfies the following conditional expression:

$$0.0272 < \Delta\theta gF$$

wherein the following conditional expressions are satisfied:

$$0.15 < Rp/ftotal < 0.90$$

$$-15.00 < Rn/ftotal < -0.15$$

where Rp denotes a radius of curvature of a refractive surface that is concave and closest to an image in the first lens unit, Rn denotes a radius of curvature of a refractive surface that is concave and closest to an object in the second lens unit, and ftotal is a focal length of an entire optical system.

14. The optical apparatus according to claim 13, wherein the following expression is satisfied:

$$6° < \omega < 25°$$

where $\omega$ is half an image pickup angle of view of the optical system.

* * * * *